United States Patent
Bayesteh et al.

(10) Patent No.: US 10,326,565 B2
(45) Date of Patent: Jun. 18, 2019

(54) SIMULTANEOUS TRANSMISSION AND RECEPTION OF AN ORTHOGONAL MULTIPLEXED SIGNAL AND A NON-ORTHOGONAL MULTIPLEXED SIGNAL

(71) Applicants: Alireza Bayesteh, Ottawa (CA); Mahmoud Taherzadeh Boroujeni, Ottawa (CA)

(72) Inventors: Alireza Bayesteh, Ottawa (CA); Mahmoud Taherzadeh Boroujeni, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 81 days.

(21) Appl. No.: 15/205,469

(22) Filed: Jul. 8, 2016

(65) Prior Publication Data

US 2018/0013526 A1    Jan. 11, 2018

(51) Int. Cl.
*H04L 5/00* (2006.01)
*H04L 27/20* (2006.01)
*H04L 27/34* (2006.01)

(52) U.S. Cl.
CPC .......... *H04L 5/0007* (2013.01); *H04L 5/0044* (2013.01); *H04L 27/20* (2013.01); *H04L 27/34* (2013.01)

(58) Field of Classification Search
CPC ........... H04J 1/06; H04J 13/00; H04L 5/0016; H04L 27/2634; H04L 27/3411; H04L 5/0021; H04L 27/2615; H04L 27/3416; H03M 13/25
See application file for complete search history.

(56) References Cited

U.S. PATENT DOCUMENTS

| | | | | |
|---|---|---|---|---|
| 2014/0140360 | A1* | 5/2014 | Nikopour | H04J 13/00 370/479 |
| 2015/0171947 | A1* | 6/2015 | Sun | H04W 4/08 370/329 |
| 2015/0282185 | A1* | 10/2015 | Nikopour | H04L 1/0002 370/329 |
| 2016/0050039 | A1* | 2/2016 | Ma | H04L 5/0016 370/329 |
| 2016/0072660 | A1* | 3/2016 | Nikopour | H04J 13/00 375/298 |

(Continued)

FOREIGN PATENT DOCUMENTS

| | | |
|---|---|---|
| CN | 104869094 A | 8/2015 |
| WO | 2014090189 A1 | 6/2014 |

*Primary Examiner* — Lakeram Jangbahadur

(57) ABSTRACT

Methods and apparatus as described herein for determining whether to transmit a signal to at least one receiver of a plurality of receivers with an orthogonal multiplexing technique while signals to a remainder of the plurality of receivers are simultaneously transmitted with a non-orthogonal multiplexing technique If it is determined that the signal should be transmitted to the at least one receiver with the orthogonal multiplexing technique, simultaneously transmitting the signal to the at least one receiver with the orthogonal multiplexing technique and the signals to the remainder of the plurality of receivers with the non-orthogonal multiplexing technique. Methods and apparatus are also described for decoding the signals on the receiving end.

22 Claims, 11 Drawing Sheets

(56) References Cited

U.S. PATENT DOCUMENTS

2016/0134400 A1    5/2016  Yi et al.
2017/0064645 A1*  3/2017  Taherzadeh Boroujeni ............... H04W 52/16

* cited by examiner

SIMULTANEOUS TRANSMISSION AND RECEPTION OF AN ORTHOGONAL MULTIPLEXED SIGNAL AND A NON-ORTHOGONAL MULTIPLEXED SIGNAL

FIELD OF THE DISCLOSURE

This application relates to simultaneous transmission of orthogonal and non-orthogonal multiplexed signals, in particular simultaneous transmission of Orthogonal Frequency Division Multiple Access (OFDMA) signals and code domain non-orthogonal multiplexed signals.

BACKGROUND

Multi-user downlink transmission involves, at a base station, multiplexing transmissions for multiple User Equipment (UEs) and transmitting a resulting multiplexed signal. The multiple UEs then receive the multiplexed signal and are responsible for decoding the portion of the multiplexed signal intended for them. Multi-user uplink transmission involves multiple UEs transmitting and the base station receiving a multiplexed version of the respective signals. The base station is then responsible for decoding each of the signals from the respective UEs.

With respect to multi-user downlink, the computational capability of decoders in UEs is limited, and therefore will impose limits on the number of signals that can be multiplexed together in a multi-user multiplexed signal and that can therefore be received and recovered.

Demand for higher data rates in telecommunications systems continues to push the need for improvements in signal transmission between a network and UEs. Improvements in multi-user downlink and uplink are an area that could aid in meeting demand for higher data rates.

SUMMARY OF THE DISCLOSURE

According to an embodiment of the disclosure there is provided a method that includes generating a first signal that includes a first stream of bits mapped to a first subset of a set of available resource elements with an orthogonal multiplexing technique. The method further includes generating a second signal that includes a plurality of third signals multiplexed together with a non-orthogonal multiplexing technique, each of the third signals including at least one second stream of bits mapped to a respective second subset of the set of available resource elements. The first and second signals are simultaneously transmitted on the set of available resource elements.

In some embodiments, generating the first signal includes mapping the first stream of bits using Orthogonal Frequency Division Multiple Access (OFDMA) and generating the second signal includes multiplexing the plurality of third signals using code domain non-orthogonal multiplexing.

In some embodiments, generating the first signal includes encoding the first stream of bits using one of Quadrature Amplitude Modulation (QAM) or Phase Shift Keying (PSK).

In some embodiments, generating the second signal includes multiplexing the plurality of third signals using Sparse Code Multiple Access (SCMA).

In some embodiments, generating the second signal further includes encoding each of the at least one second streams of bits associated with the third signals using at least one SCMA codebook.

In some embodiments, the first subset of a set of available resource elements and the second subsets of the set of available resource elements share a common time-frequency resource.

In some embodiments, the method further includes determining a first stream of bits should be used in generating the first signal using the orthogonal multiplexing technique.

In some embodiments, determining the first stream of bits should be used in generating the first signal includes determining a complexity value for decoding the first stream of bits and the at least one second streams of bits in the second signal to be transmitted, if the stream of bits were all to be transmitted as part of the second signal using the non-orthogonal multiplexing technique. If the complexity value is greater than a complexity threshold defining a complexity value for decoding the second signal, a further step includes mapping the first stream of bits with the orthogonal multiplexing technique.

In some embodiments, the method further includes receiving an indication of a complexity constraint of a receiver to at least in part define the complexity threshold.

In some embodiments, the determining whether the stream of bits should be used in generating the first signal or the second signal is based on a spectral efficiency of the stream of bits.

In some embodiments, the determining whether the stream of bits should be used in generating the first signal or the second signal is based on a spectral efficiency of the stream of bits and a signal-to-noise ratio difference between the communications channels over which the stream of bits and other streams of bits being transmitted on the same set of available resource elements.

In some embodiments, simultaneously transmitting the first and second signals includes transmitting in a downlink direction from a network side component to a plurality of User Equipment (UEs).

In some embodiments, the method further includes setting transmission power for the first signal and for the second signal resulting in a power offset between the first signal and the second signal.

In some embodiments, the method further includes transmitting an indication of the power offset between the first signal and the second signal.

In some embodiments, the method further includes transmitting an indication of a modulation and coding scheme used to encode at least one of the first signal and at least one of the third signals of the second signal.

In some embodiments, the method further includes transmitting to at least one receiver an indication of a type of the multiplexing technique that is used to transmit at least one of the first signal and at least one of the plurality of third signals in the second signal being transmitted to the at least one receiver.

In some embodiments, the indication is an implicit indication that the multiplexing technique is an orthogonal multiplexing technique.

According to an embodiment of the disclosure there is provided an apparatus including orthogonal multiplexing circuitry, non-orthogonal multiplexing circuitry, a transmitter, a processor; and a computer-readable medium. The computer-readable medium has stored thereon computer executable instructions. When executed by the processor, the computer executable instructions are configured to control the orthogonal multiplexing circuitry to generate a first signal that includes a first stream of bits mapped to a first subset of a set of available resource elements with an orthogonal multiplexing technique. When executed by the processor, the computer executable instructions are also configured to control the non-orthogonal multiplexing circuitry to generate a second signal that includes a plurality of third signals multiplexed together with a non-orthogonal multiplexing technique, each of the third signals including at least one second stream of bits mapped to a respective subset of the set of available resource elements. The transmitter is configured to simultaneously transmit the first and second signals on the set of available resource elements.

In some embodiments, the orthogonal multiplexing circuitry is configured to map the first stream of bits using Orthogonal Frequency Division Multiple Access (OFDMA) and the non-orthogonal multiplexing circuitry is configured to multiplex the plurality of third signals using code domain non-orthogonal multiplexing.

In some embodiments, the non-orthogonal multiplexing circuitry is configured to multiplex each of the third signals by using Sparse Code Multiple Access (SCMA).

In some embodiments, non-orthogonal multiplexing circuitry is configured to encode the first set of bits using one of Quadrature Amplitude Modulation (QAM) or Phase Shift Keying (PSK).

In some embodiments, the computer executable instructions, when executed by the processor, are further configured to determine that the first stream of bits should be used in generating the first signal using the orthogonal multiplexing technique.

In some embodiments, the computer executable instructions, when executed by the processor, are further configured to determine a complexity value for decoding the first stream of bits, and the at least one second streams of bits being transmitted if the streams of bits were to be transmitted as part of the second signal using only a non-orthogonal multiplexing technique and if the complexity value is greater than a complexity threshold defining a complexity value for decoding the streams of bits, map the first stream of bits with the orthogonal multiplexing technique.

In some embodiments, the apparatus is configured to receive an indication of a complexity constraint of a receiver, to at least in part define the decoding complexity threshold.

In some embodiments, the computer executable instructions, when executed by the processor, are configured to determine whether a stream of bits should be transmitted as the first signal or as part of the second signal based on the spectral efficiency of the stream of bits.

In some embodiments, the computer executable instructions, when executed by the processor, are configured to determine whether a stream of bits should be transmitted as the first signal or as part of the second signal based on a spectral efficiency of the stream of bits and a signal-to-noise ratio difference between the communications channels over which the stream of bits and other streams of bits being transmitted on the same set of available resource elements.

In some embodiments, the apparatus is configured to transmit in a downlink direction to a plurality of User Equipment (UEs).

In some embodiments, the apparatus is configured to set a transmission power for the first and the second signal resulting in a power offset between the first signal and the second signal.

In some embodiments, the apparatus is configured to transmit an indication of the power offset between the first signal and the second signal.

In some embodiments, the apparatus is configured to transmit an indication of a modulation and coding scheme used to encode at least one of the first signal and at least one of the third signals of the second signal.

In some embodiments, the apparatus is configured to transmit to at least one receiver an indication of a type of the multiplexing technique that is used to map the stream of bits being transmitted to the at least one receiver.

According to an embodiment of the disclosure there is provided a method including receiving a signal that includes a first signal and a second signal. The first signal includes a first stream of bits mapped on a first subset of a set of available resource elements with an orthogonal multiplexing technique. The second signal includes a plurality of third signals multiplexed together with a non-orthogonal multiplexing technique, each of the plurality of third signals including at least one second stream of bits mapped on a respective subset of the set of available resource elements. The method further includes decoding at least one of the plurality of third signals mapped on a respective subset of the set of available resource elements with the non-orthogonal multiplexing technique.

According to an embodiment of the disclosure there is provided an apparatus including at least one antenna and receiver for receiving a signal. The signal including a first signal that includes a first stream of bits mapped on a first subset of a set of available resource elements with a non-orthogonal multiplexing technique and a second signal that includes a plurality of third signals multiplexed together with a non-orthogonal multiplexing technique, wherein each of the plurality of third signals is at least one other stream of bits mapped on a respective subset of the set of available resource elements. The apparatus also includes a processor and a computer-readable medium. The computer-readable medium includes computer executable instructions that when executed by the processor are configured to decode at least one of the third signals mapped on a respective subset of the set of available resource elements with the non-orthogonal multiplexing technique.

Other aspects and features of the present disclosure will become apparent, to those ordinarily skilled in the art, upon review of the following description of the various embodiments of the disclosure.

BRIEF DESCRIPTION OF THE DRAWINGS

Embodiments will now be described with reference to the attached drawings in which.

DETAILED DESCRIPTION OF EMBODIMENTS

It should be understood at the outset that although illustrative implementations of one or more embodiments of the present disclosure are provided below, the disclosed systems and/or methods may be implemented using any number of techniques. The disclosure should in no way be limited to the illustrative implementations, drawings, and techniques illustrated below, including the designs and implementations illustrated and described herein, but may be modified within the scope of the appended claims along with their full scope of equivalents.

Code Division Multiple Access (CDMA) is a multiple access technique in which data symbols are spread out over orthogonal code sequences, near orthogonal code sequences, or a combination of both. Conventional CDMA encoding is a two-step process in which a binary code is mapped to a Quadrature Amplitude Modulation (QAM) symbol before a spreading sequence is applied. Although conventional CDMA encoding can provide relatively high coding rates, new techniques/mechanisms for achieving even higher coding rates are needed to meet the ever-growing demands of next-generation wireless networks. Low Density Spreading (LDS) is a form of CDMA used for multiplexing different layers of data. LDS uses repetitions of the same symbol on specific layers at nonzero locations in a time/frequency resource. As an example, in LDS-Orthogonal Frequency Division Multiplexing (OFDM) a constellation point is repeated over nonzero frequency tones of an LDS block. In Sparse Code Multiple Access (SCMA), a multidimensional codebook is used to spread data over tones without necessarily repeating symbols. In SCMA the multidimensional spreading codebooks are sparse and hence decoding can be made simpler.

The decoding complexity of SCMA may become prohibitive for very high rates, resulting from, for example, a large number of layers, very large constellations, or a combination of the two.

Aspects of the present disclosure involve Multi-User SCMA (MU-SCMA). MU-SCMA may aid in increasing downlink cell throughput and cell edge throughput. MU-SCMA may aid in enabling open-loop UE multiplexing. MU-SCMA may have robustness to Channel State Information (CSI) feedback accuracy, robustness to channel aging, and robustness to issues that may arise from UE mobility.

Figure 1:
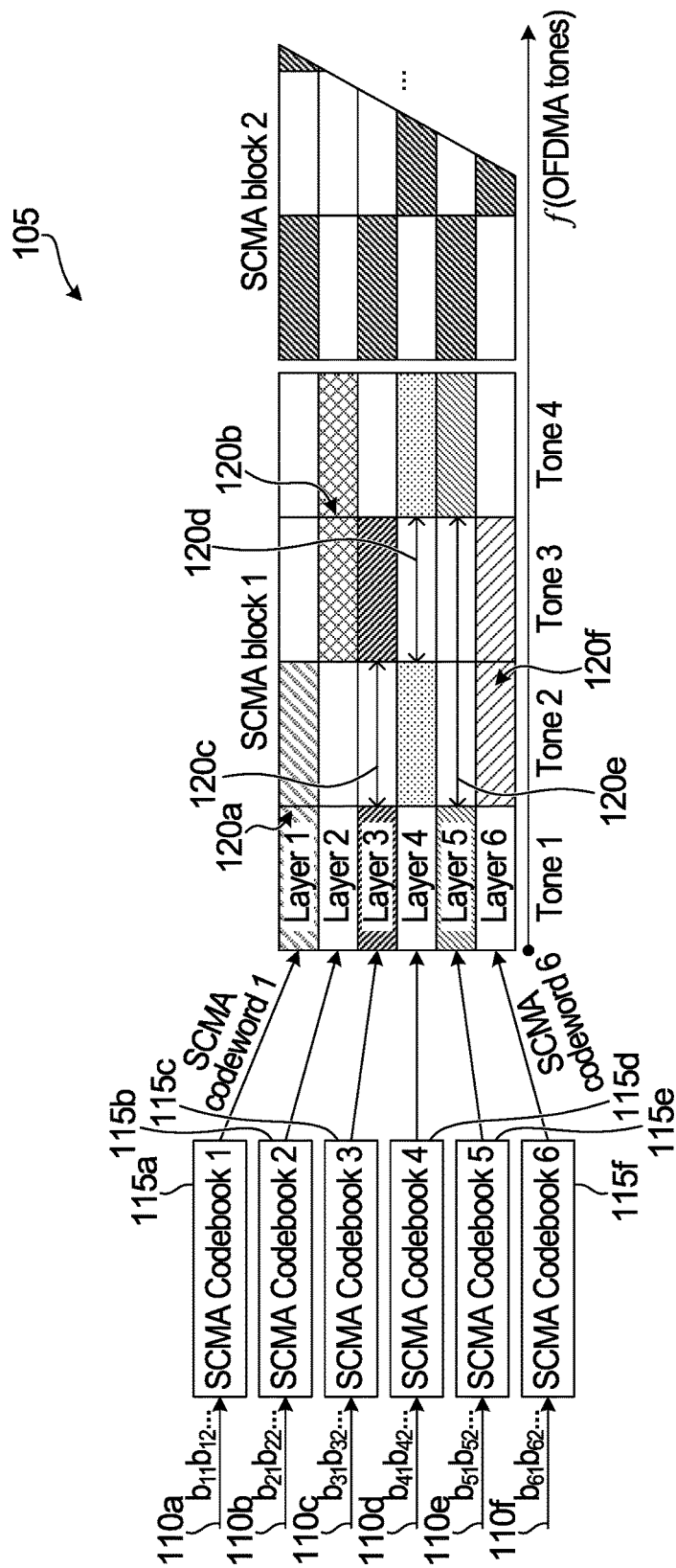
FIG. 1 is a schematic diagram of a multi-user Sparse Code Multiple Access (SCMA) that can be used according to an aspect of the disclosure.

Referring to FIG. 1, an example of multi-layer SCMA non-orthogonal multiplexing technique 105 will be described. Six streams of bits 110a, 110b, 110c, 110d, 110e and 110f are each shown being encoded using one of six SCMA codebooks 115a, 115b, 115c, 115d, 115e and 115f. Each SCMA codebook outputs a respective SCMA codeword 120a, 120b, 120c, 120d, 120e and 120f. The SCMA codewords are used in constructing transmission resources called SCMA blocks for transmission over an air interface. The SCMA blocks are multiple layers over multiple transmission tones (Tone 1, Tone 2, Tone 3, Tone 4). As shown in FIG. 1, each SCMA codeword is spread over multiple transmission tones of a respective layer (Layer 1, Layer 2, Layer 3, Layer 4, Layer 5, Layer 6) of an SCMA block (SCMA Block 1 and a portion of SCMA block 2 are shown). A first SCMA codeword 120a is spread over Tones 1 and 2 of Layer 1 of a first SCMA block. A second SCMA codeword 20b is spread over Tones 3 and 4 of Layer 2 of the first SCMA block. A third SCMA codeword 120c is spread over Tones 1 and 3 of Layer 3 of the first SCMA block. A fourth SCMA codeword 120d is spread over Tones 2 and 4 of Layer 4 of the first SCMA block. A fifth SCMA codeword 120e is spread over Tones 1 and 4 of Layer 5 of the first SCMA block. A sixth SCMA codeword 120f is spread over Tones 2 and 3 of Layer 6 of the first SCMA block.

The SCMA non-orthogonal multiplexing technique allows overloading to increase the overall transmission rate and connectivity between a transmitter and multiple receivers. The sparsity used in encoding the codewords results in reducing the complexity of decoding. The SCMA codewords are multi-dimensional codewords that may include shaping gain and improve spectral efficiency. The SCMA codewords are spread as part of the encoding process that may result in robust link-adaptation.

A UE may apply a Message Passing Algorithm (MPA) decoder to decode the signal that is intended for the UE in the multi-user multiplexed signal. As part of the decoding process, the decoder separates the multiplexed layers.

Figure 2:
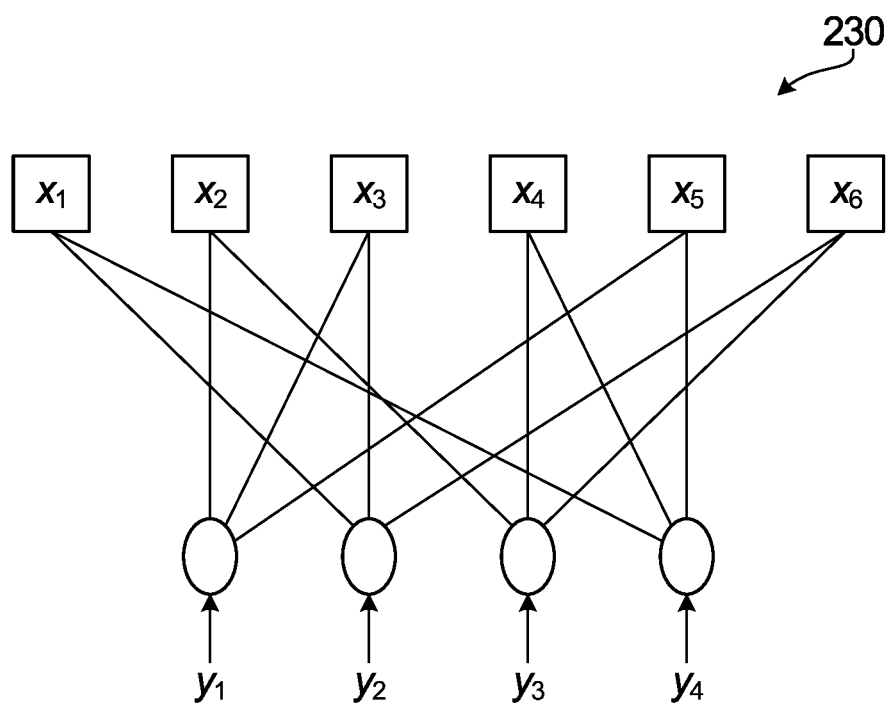
FIG. 2 is an example of a factor graph that may be used in Message Passing Algorithm (MPA) decoding of SCMA symbols.

MPA is an iterative decoding algorithm that operates to factorize a global function of multiple first variables into a product of simpler local functions, whose arguments are a set of second variables. One manner of visualizing this factorization is to use a factor graph. FIG. 2 illustrates an example of a factor graph 230 that may be used by an MPA to aid in recovering the signal intended for the UE in the multi-user multiplexed signal. The factor graph 230 illustrates a collection of nodes that are connected. Nodes $x_1$, $x_2$, $x_3$, $x_4$, $x_5$, $x_6$ are representative of the layers in the received multiplexed signal and nodes $y_1$, $y_2$, $y_3$, $y_4$ are representative of the tones of the SCMA block that the signal is being transmitted on. The sparsity of the SCMA codewords used at the transmitter allows for a low complexity receiver.

The computational capability of a receiver may impose limits on how a multi-user multiplexed signal is generated at the transmitter. For example, the computational capability of the receiver may limit the effective transmission rate and gain that can be used for MU-SCMA. One non-limiting example of limitations that may be imposed due to the computational capability of the receiver includes the number of multiplexed SCMA layers being limited to 6 layers, the size of individual codewords in the SCMA codebook being a 16-point codebook and a spreading factor for the SCMA codewords being equal to 4.

In a further example, the computational capability of the receiver sets a limit that the receiver can decode up to 6 layers of 16-point constellations. If two of the six layers are allocated to a low-rate UE, there are only four layers left for a high rate UE. For a constellation size of 16 points, only 4 bits of data can be transmitted per layer (i.e. $2^4$=16). Because there are four layers for the high rate UE and applying a spreading factor of four, the maximum number of bits per tone that can be transmitted and decoded by the receiver is 4 bits/tone. Due to the computational capability of the UE receiver limiting the complexity of the multi-UE multiplexed signal, a UE that is capable of receiving a high transmission rate signal, which may be transmitted on multiple layers, may not be served with a sufficient number of layers to adequately provide the signal to the UE, even if its Channel Quality Indicator (CQI) is large enough to support the numbers of layers that would be needed.

An aspect of the present disclosure is to simultaneously transmit at least one signal to at least one UE of the multiple UEs using OFDMA while other signals are transmitted to other UEs using code domain non-orthogonal multiplexing to provide improved spectral efficiency and more scheduling flexibility and robustness. Spectral efficiency is defined as the net data rate in bits per second (bps) divided by the bandwidth in Hertz. In some embodiments the other signals are transmitted to the other UEs using SCMA. It may be advantageous to transmit the signals in this manner because the signal transmitted using OFDMA may be transmitted on a single layer, reducing the number of layers needed for transmission of the multiple multiplexed signals, as opposed to if the signals were all transmitted using separate SCMA layers. Although a signal may be transmitted using OFDMA on a single layer, multiple OFMDA signals could be transmitted over a same set of tones, superimposed by using a power differential for transmitting the respective OFDMA signals.

Figure 3A:
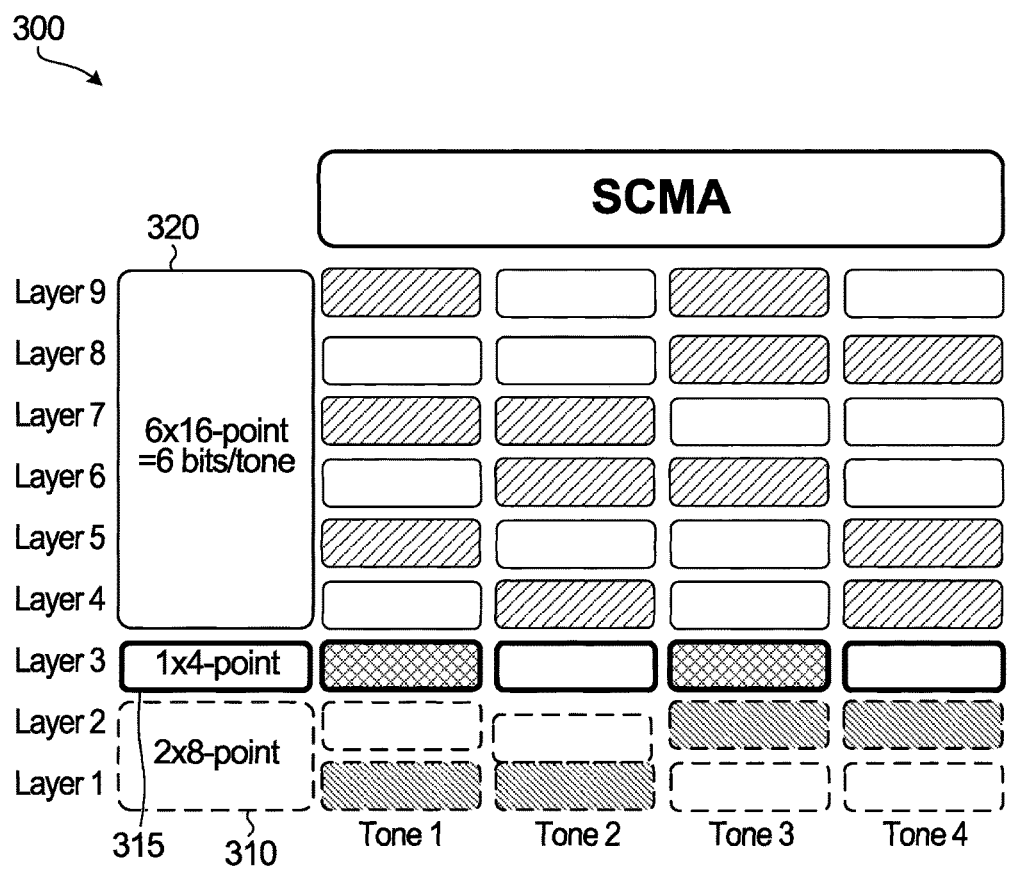
FIG. 3A is an example of SCMA signals being prepared for simultaneous transmission to three UEs, using nine layers of data, according to an aspect of the disclosure.
Figure 3B:
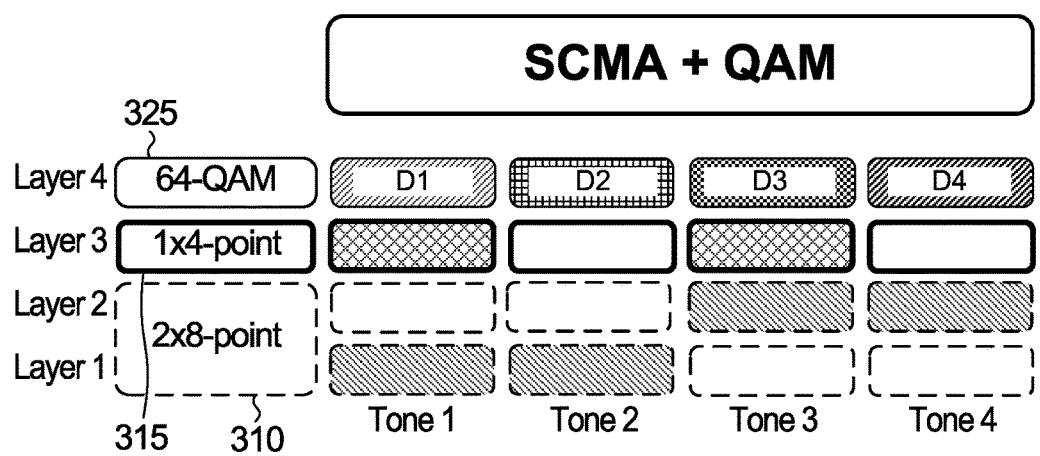
FIG. 3B is diagram of an example of three signals, two SCMA and one Orthogonal Frequency Division Multiple Access (OFDMA), being prepared for simultaneous transmission to three UEs according to an aspect of the disclosure.

An example illustrating the difference between transmitting to three UEs using MU-SCMA and to the same three UEs using SCMA multiplexed with OFDMA is shown in FIGS. 3A and 3B.

FIG. 3A shows an SCMA block 300 having an allocation of nine layers (Layer 1, ..., Layer 9) and four tones (Tone 1, Tone 2, Tone 3, Tone 4) in order to transmit to the three UEs using SCMA. Each input bit stream is encoded on a separate layer. A first SCMA signal 310 for the first UE includes two eight-point constellations. One eight-point constellation is spread over first and second tones (Tone 1, Tone 2) of a first layer (Layer 1) and the other eight-point constellation is spread over third and fourth tones (Tone 3, Tone 4) of a second layer (Layer 2). A second SCMA signal 315 for the second UE includes one four-point constellation that is spread over first and third tones (Tone 1, Tone 3) of a third layer (Layer 3). A third SCMA signal 320 for the third UE, who is considered a "high rate UE" capable of receiving a high transmission rate signal, includes six sixteen-point constellations. Each constellation is spread over a subset of tones of a respective layer. A first sixteen-point constellation is spread over second and fourth tones (Tone 2, Tone 4) of a fourth layer (Layer 4), a second sixteen-point constellation is spread over first and fourth tones (Tone 1, Tone 4) of a fifth layer (Layer 5), a third sixteen-point constellation is spread over second and third tones (Tone 2, Tone 3) of a sixth layer (Layer 6), a fourth sixteen-point constellation is spread over first and second tones (Tone 1, Tone 2) of a seventh layer (Layer 7), a fifth sixteen-point constellation is spread third and fourth tones (Tone 3, Tone 4) of an eighth layer (Layer 8) and a sixth sixteen-point constellation is spread over first and third tones (Tone 1, Tone 3) of a ninth layer (Layer 9).

A relative complexity level of decoding the three signals in the SCMA block can be estimated based on a product of the complexity for decoding each of the three signals. The complexity is proportional to the number of points in a constellation raised to the power of the number of layers in a given signal that has an SCMA component being transmitted per tone. For the first SCMA signal 310, the number of points in the constellation is eight. Even though the codeword is encoded on two layers, there is only a single SCMA component per tone due to the spreading of the codewords. For the second SCMA signal 315, the number of points in the constellation is four. Because the codeword is spread over a single layer, there is only a single overlapping SCMA component per tone. For the third SCMA signal 320, the number of points in the constellation is sixteen. There are three SCMA components per tone. The first tone has codeword components in the fifth, seventh and ninth layers. The second tone has codeword components in the fourth, sixth and seventh layers. The third tone has codeword components in the sixth, eighth and ninth layers. The fourth tone has codeword components in the fourth, fifth and eighth layers. Therefore, the complexity for decoding the codewords is proportional to:

$$8^1 \times 4^1 \times 16^3 = 2^{17}.$$

If the computational capability of the UE was known to be, for example, sufficient to decode three SCMA components per tone with a sixteen-point constellation (i.e., $16^3 = 2^{12}$) and the required complexity for decoding the multiplexed SCMA signals was known to be approximately $2^{17}$, as indicated above, then the UE would not be able to decode all of the signals properly due to a lack of computational power.

FIG. 3B shows an SCMA block having an allocation of four layers (Layer 1, ..., Layer 4) and four tones (Tone 1, Tone 2, Tone 3, Tone 4) allocated for three UEs. The first SCMA signal 310 is spread over tones and layers in the same manner as in FIG. 3A. The second SCMA signal 315 is spread over tones and a single layer in the same manner as in FIG. 3A. On Layer 4 is a 64-point constellation QAM signal 325 represented by four QAM symbols one symbol separately mapped on each tone (Tone 1, Tone 2, Tone 3, Tone 4). Although QAM is used in FIG. 3B as an example, it is to be understood that other modulation techniques could be used.

The complexity of decoding the components for the two SCMA signals and 64-point QAM signal in FIG. 3B is proportional to a product of the complexity for decoding each of the three components. The first two signals have a same complexity as in FIG. 3A. For the 64-point QAM signal, the number of points in the constellation is 64, but there is only a single QAM symbol per tone. Therefore, the complexity for decoding the signals is proportional to:

$$8^1 \times 4^1 \times 64 = 2^{11}.$$

Once again, if the computational capability of the UE was known to be, for example, $16^3$, and the order of magnitude of the complexity for decoding the two SCMA signals and the 64 point QAM signal was known to be $2^{11}$, as indicated above, then the UE would have the computational capability to be able to decode the signals.

Figure 4:
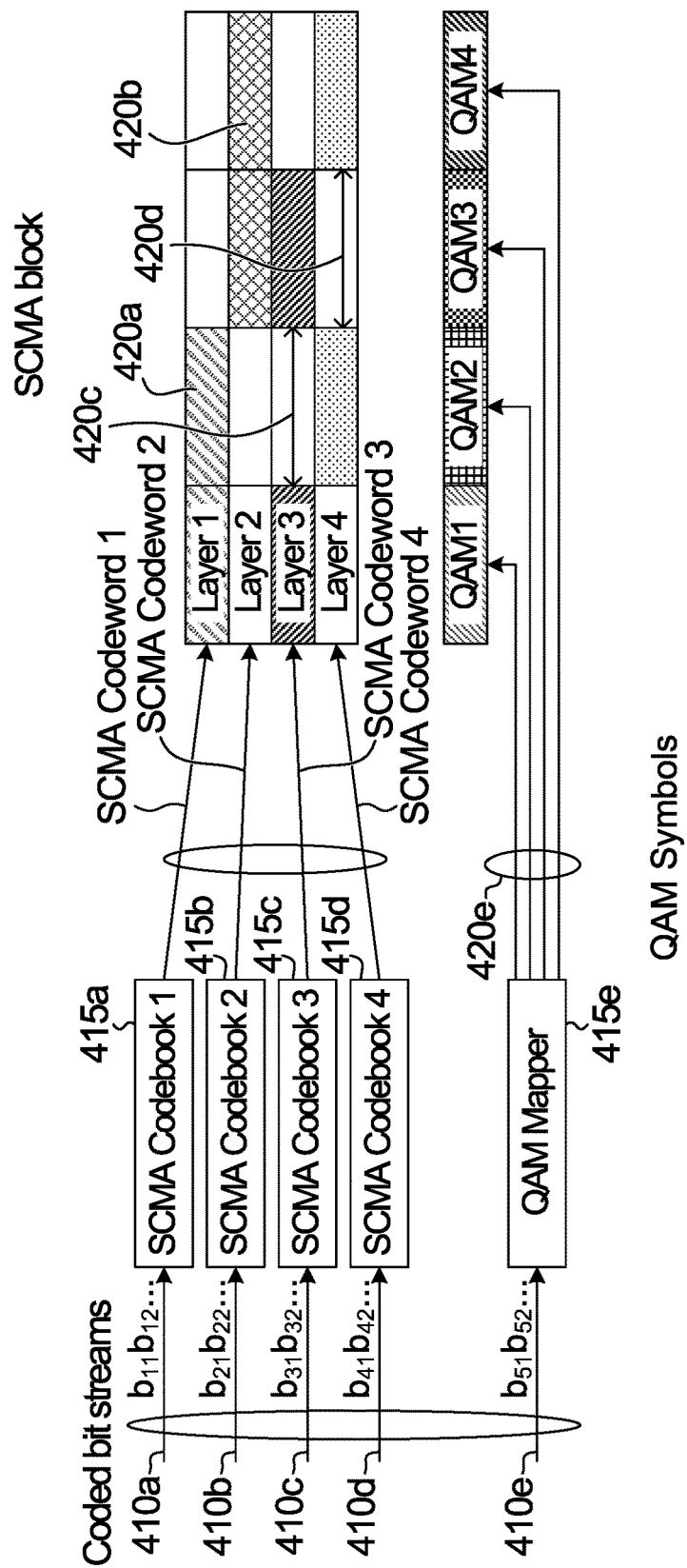
FIG. 4 is a schematic diagram of a multi-user SCMA and OFDMA multiplexing technique according to an aspect of the disclosure.

Referring to FIG. 4, an example of using multi-user multiplexed SCMA and OFDMA will be described. FIG. 4 is similar to FIG. 1, except that instead of six streams being encoded by SCMA codebooks as illustrated in FIG. 1, four streams are encoded by SCMA codebooks and a single stream is provided to a QAM mapper in FIG. 4. Four coded streams of bits 410a, 410b, 410c and 410d are shown being provided to four SCMA codebooks 415a, 415b, 415c and 415d. One stream of bits 410e is shown being provided to a single QAM mapper 415e. Each SCMA codebook outputs a respective SCMA codeword 420a, 420b, 420c and 420d and QAM mapper outputs a set of QAM symbols 420e. The SCMA codewords and QAM symbols are transmitted in transmission resource blocks over an air interface. The transmission resource blocks contain multiple transmission tones. As shown in FIG. 4, each SCMA codeword is spread over multiple tones and the QAM symbols are transmitted on a single layer. A first SCMA codeword 420a is spread over the first and second tones of the tones of the transmission resource block. A second SCMA codeword 420b is spread over the third and fourth tones of the tones of the transmission resource block. A third SCMA codeword 420c is spread over the first and third tones of the tones of the SCMA block. A fourth SCMA codeword 420d is spread over the second and fourth tones of the tones of the transmission resource block. The four QAM symbols 420e are transmitted on the four tones of the SCMA block. It is noted that the tones that the QAM symbols are being transmitted on are being referred to herein as an SCMA block even though the QAM symbols are not SCMA components. Although examples above describe the use of QAM, it is to be understood that other non-QAM forms of modulation could be used for the OFDMA portion of the signal, such as, but not limited to Phase Shift Keying (PSK).

It is to be understood that although five layers are illustrated in the example of FIG. 4, more generally the number of layers is implementation specific and could be more or less than five, in part depending, for example, on the computational capability of receivers.

A UE receiving a high transmission rate signal, such as a 64 QAM signal, together with SCMA signals may not be able to decode the 64 QAM signal if the complexity of the multi-user multiplexed signal provided to the MPA decoder of the UE exceeds the computational capability of the MPA decoder. In such a scenario, the UE may decode the SCMA layers first and then remove the SCMA layers from the received signal and recover the OFDMA signal.

Figure 5:
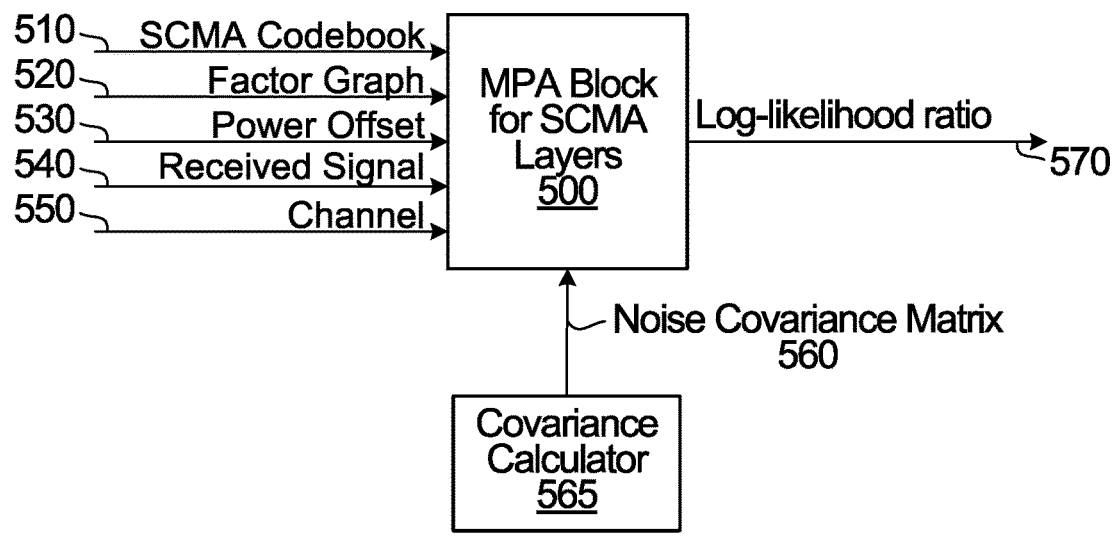
FIG. 5 is a block diagram of a MPA according to an aspect of the disclosure.

FIG. 5 is an example of a representative MPA decoder 500 that may be used in a UE. The MPA decoder 500 has multiple inputs. A first input is at least one SCMA codebook 510, each SCMA codebook defining multiple SCMA codewords. A second input is a factor graph 520, for example the factor graph 30 of FIG. 2. A third input is a power offset value 530 that indicates the difference between power used for transmission of SCMA signal(s) and OFDMA signal(s). A fourth input is the received multi-user multiplexed signal 540. A fifth input is an estimate 550 of a channel(s) on which the multi-user multiplexed signal is received. For a downlink scenario a UE utilizes a signal channel estimate between a base station, for example, and the UE. For an uplink scenario, a base station utilizes signal channel estimates between the base station and each of the UEs the base station is in communication with. A sixth input is a noise covariance matrix 560. The noise covariance matrix 560 can be generated by a noise covariance calculator 565. An output of the MPA decoder 500 is one or more streams of log-likelihood ratio values 570.

Figure 6:
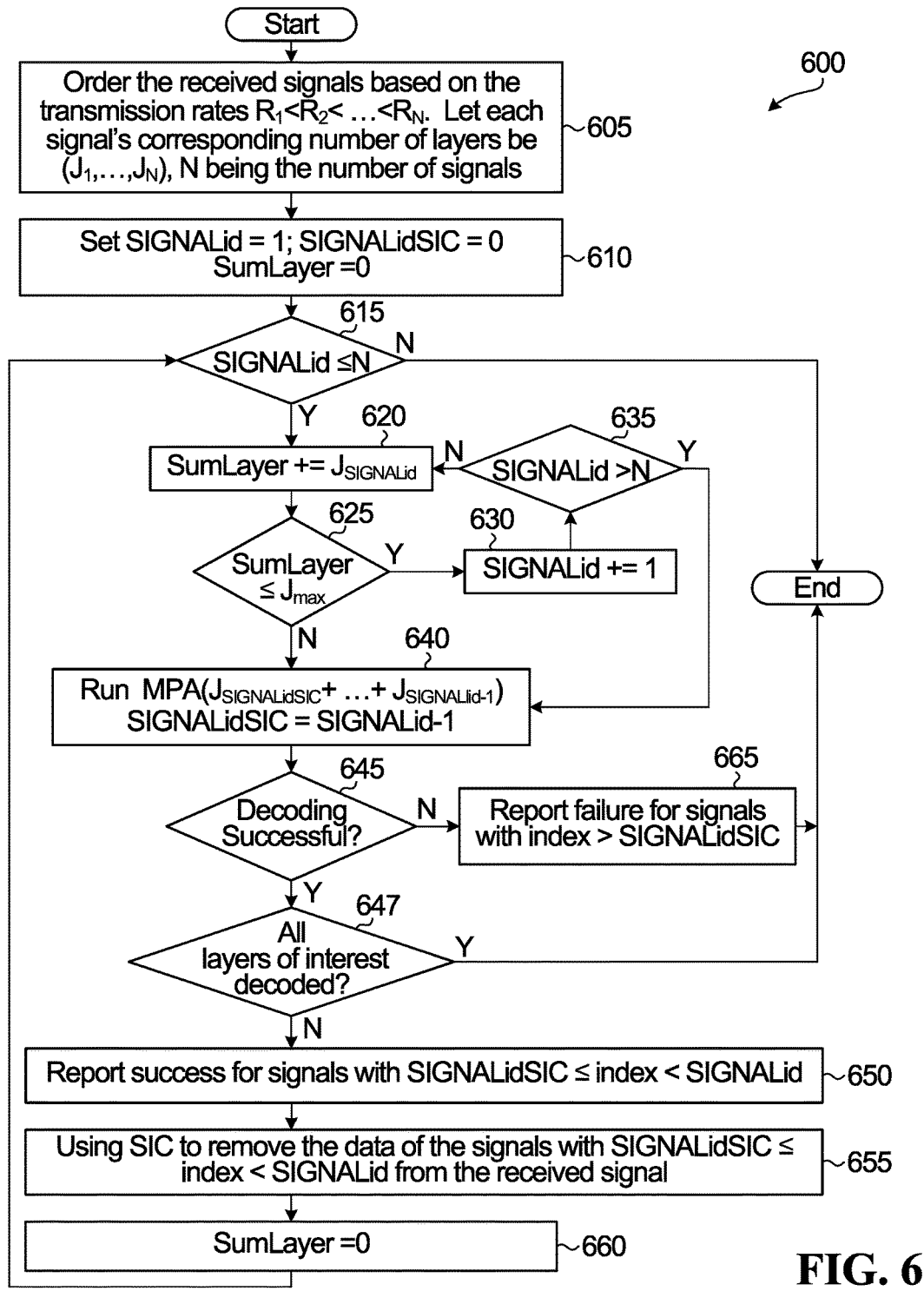
FIG. 6 is a flow chart describing a method for use in multi-user MPA decoding for SCMA and mixed SCMA/OFDMA according to an aspect of the disclosure.

In the scenario where the UE decodes the SCMA layers first and then removes the SCMA layers from the received signal and recovers the OFDMA signal(s), the MPA decoder 500 considers the factor graph 520 and removes branches from the factor graph that correspond to the layers used for OFDMA. Signal components on these layers are of a high enough transmission rate that, for the sake of decoding the SCMA signals, these OFDMA signals can be considered noise. Removing the branches results in a revised factor graph. The noise covariance calculator 565 can then be used to recalculate the noise covariance matrix 560 for the remaining SCMA layers to generate an updated noise covariance matrix, including the effect of OFDMA signals. The MPA decoder 500 can then use the revised factor graph and the updated noise covariance matrix to decode the SCMA layers. After successful decoding of the SCMA layers, the effect of the SCMA layers can be removed from the received signal and the OFDMA signal(s) can be decoded using conventional schemes. The SCMA layers could be removed using a Successive Interference Cancellation (SIC) scheme, for example. Referring to the flow chart of FIG. 6, a process 600 for multi-user MPA decoding of SCMA and mixed SCMA/OFDMA will now be described. When a base station is transmitting the multi-user multiplexed signal having mixed SCMA/OFDMA, the process 600 may be performed at any of a number of UEs that are receiving a multi-user multiplexed signal including mixed SCMA/OFDMA. When multiple UEs are simultaneously transmitting a combination of SCMA and OFDMA signals in an uplink direction, the process 600 may be performed at a base station that is receiving the SCMA and OFDMA signals. Although the example below is explained in terms of a UE being a receiver of a combined SCMA/OFDMA signal, it is to be understood that in an alternative embodiment, a base station could be performing the process. Furthermore, although the example below describes ranking UEs based on signal rate, more generally, the ranking could be performed on a layer basis. The ranking may be based on a different criterion than transmission rate, such as SNR of the layers.

The UE receives the multi-user multiplexed signal and decodes the SCMA signal components on the respective layers to recover the signal intended for the UE. The UE may not need to decode the SCMA components on all of the layers if the UE is able to decode the signal intended for the UE before the SCMA components of all the layers are decoded. The UE may initially, before the start of the process 600 as described below, have received information specifying what type of signal the UE will receive, i.e. SCMA or OFDMA, how many layers the signal intended for the UE will be transmitted on and/or how many layers other signals intended for other UEs will be transmitted on, the Modulation and Coding Scheme (MCS) of the signal intended for the receiver, the MCS for other signals intended for other receivers, and the power offset between SCMA and OFDMA signals.

In step 605 of the process 600 the UE, with the knowledge of the transmission rates of signals in the multi-user multiplexed signal, ranks the received signals based on the respective transmission rates of the received signals, $R_1 < R_2 < \ldots < R_N$, where $R_i$, i=1 to N is the rate of each of the signals and N is the total of number of signals. The total number of signals is the sum of signals transmitted using an orthogonal multiplexing technique and signals transmitted using a non-orthogonal multiplexing technique. Each of the N signals may have one or more layers identified as $J_1, J_2, \ldots, J_N$. In step 610, the UE identifies the signal with a lowest signal transmission rate with index identifier $SIGNAL_{id}=1$, sets a variable identifying an index of a signal that was most recently successfully decoded ($SIGNAL_{idSIC}$) equal to 0, and sets a variable identifying a sum of a number of layers (SumLayer) that are included in the layers attempting to be decoded equal to 0. Step 615 is a decision step in which the UE determines if the index of the current signal, $SIGNAL_{id}$, is less than or equal to N. If "No" at decision step 615 the process 600 ends. If "Yes" at decision step 615, then at step 620 the UE increments the variable SumLayer by the amount of the number of layers ($J_{SIGNALid}$) included in the signal identified by $SIGNAL_{id}$.

Step 625 is a decision step in which the UE determines if the number of layers in the SumLayer variable is less than or equal to the maximum number of layers, $J_{max}$, that a decoder is capable of processing. If "No" at decision step 625, then at step 640 the UE runs the MPA for a number of layers than includes $J_{SIGNALidSIC}+\ldots+J_{SIGNALid-1}$) where $SIGNAL_{idSIC}$ is set equal to $SIGNAL_{id}-1$.

If "Yes" at decision step 625, at step 630 the UE increments the variable $SIGNAL_{id}$ by 1. Step 635 is a decision step in which the UE determines if the variable $SIGNAL_{id}$ is greater than N. If "No" at decision step 635, the process 600 returns to step 620.

If "Yes" at decision step 635, the process 600 advances to step 640.

Following the execution of step 640, at step 645 the UE determines if decoding was successful for each of the layers that were being decoded. If "No" at decision step 645, at step 665 the failure of decoding the at least one layer is reported, i.e. the layers associated with signals with an index greater than $SIGNAL_{idSIC}$. The process 600 is finished at this point.

If "Yes" at decision step 645, the process 600 advances to step 647. At step 647, the UE determines if all layers of interest have been decoded. Layers of interest for a downlink scenario include all the layers intended for the present UE. In a downlink scenario the UE wants to decode at least the UEs own layers. The UE may need to decode the layers intended for other UEs before the UE decodes the UE's own layers. Once the UE decodes the UE's own layers the UE may stop attempting to decode additional layers.

Layers of interest for an uplink scenario include the layers of all the UEs because in the uplink scenario, a network side device, such as a base station, needs to recover all of the signals the network side device receives.

If "Yes" at decision step 647, the process 600 ends. If "No" at decision step 647, the process 600 advances to step 650.

At step 650, the successful decoding of layers having an index greater than the previous $SIGNAL_{idSIC}$, but less than $SIGNAL_{id}$ is reported.

Step 655 involves removing the successfully decoded layers from the multi-user multiplexed signal using a SIC process.

In step 660, the SumLayer variable is reset to 0 and the process proceeds from step 615.

The above process allows the MPA to be executed for sets of layers of signals in the multi-user multiplexed signal. Therefore, if the UE does not have the computational capability to decode all of the layers at one time, it is not necessary to run the MPA and attempt to decode all of the layers at once. The UE can decode several layers in a single iteration, and then run a further iteration of the MPA decoder to decode additional layers. Such a process can be repeated until all of the layers are recovered.

In a case where the UE is the UE for which the OFDMA signal is intended, the MPA decoder of the UE first processes the layers of all of the SCMA signals, and can then proceed to decode the OFDMA signal.

Power Allocation between OFDMA and SCMA Layers

Transmission power may be allocated between the OFDMA layers and the SCMA layers to maximize a performance metric between the transmitter and one or more receivers. An example of this may be along the lines of proportional fairness, which is a compromise-based scheduling algorithm used in order to maintain a balance between competing interests.

For a receiver using an MPA decoder and a SIC scheme to first decode the SCMA signals and then decode the OFDMA signal, in some embodiments knowledge of a power offset between the SCMA signals and the OFDMA signal can be used to increase the chances that the SCMA layers are decoded successfully. A power offset is a difference between the sum power of the SCMA signals and the sum power of OFMDA signals. The power offset between the SCMA signals and the OFDMA signal is set at a transmission point of the SCMA and OFDMA signals. The power offset may be a result of setting the transmission power for either the SCMA or OFDMA signals and applying a desired power offset to obtain the transmission power of the other signal. Alternatively, the transmission power of both the SCMA and OFDMA may be set at desired levels and the difference in transmission power results in the power offset.

A power offset a between transmitted OFDMA and SCMA layers can be used to decode the SCMA layers and the OFDMA layers.

A representation of the received multi-user multiplexed signal is:

$$Y=H(X_{SCMA}+X_{OFDM})+w$$

where Y is the received multi-user multiplexed signal, H is an estimation of the channel, $X_{SCMA}$ are the SCMA layers of the transmitted signal, $X_{OFDMA}$ are the OFDMA layers of the transmitted signal, and w is a noise component.

Knowing a total transmission rate being used for the SCMA layers, it is possible to determine a threshold on $\alpha$ such that the following constraint is satisfied:

$$R_{SCMA} \leq \log |I+P_{SCMA}HH^H(R_{ww}+\alpha P_{SCMA}HH^H)^{-1}|$$

where $R_{SCMA}$ is total transmission rate of the SCMA signals, $P_{SCMA}$ is the power of the SCMA layers, H is an estimation of the channel, $H^H$ is the Hermitian transform of the channel estimation, $R_{ww}$ the noise covariance matrix and $\alpha$ is the above-identified power offset.

In another embodiment, a threshold on a can be obtained from the following:

$$\alpha \leq \frac{SNR - \gamma_{th}}{\gamma_{th}(1+SNR)}$$

where $\alpha$ is the power offset, SNR is a total Signal-to-Noise Ratio (SNR) for the combined SCMA and OFDMA signals, and $\gamma_{th}$ is a minimum required Additive White Gaussian Noise Signal-to-Noise Ratio (AWGN SNR) for decoding of SCMA layers.

Selecting between SCMA and OFDMA for Transmission

The intended signal for a UE that can receive a high transmission rate signal can be switched between SCMA and OFDMA depending on one or more factors. One factor may be a UE computational capability. Another factor may be the spectral efficiency of the signal intended for the UE. A further factor may be a relative SNR of the various UEs receiving the multi-user multiplexed signal.

The following is an example of decision criteria that may be used for determining whether to transmit a signal for a particular UE using OFDMA or SCMA in the multi-user multiplexed signal.

UEs that are being scheduled together for MU-SCMA are grouped based on a selected criterion. A non-limiting example is maximizing a performance metric, such as a proportional fairness factor. The modulation and coding scheme (MCS) and number of layers for the signals being multiplexed together are determined assuming SCMA transmission for all signals. For a SIC based MPA decoding, if the MPA decoding complexity is less than the computational capability of the high-rate UE and the SNR difference between the communications channels over which the signal and other signals being transmitted on a same set of available resource elements is not high, then all signals can be transmitted using SCMA.

If the spectral efficiency of a signal to be received by a high-rate UE is high, and the MPA decoding complexity is greater than the computational capability of the high-rate UE then the signal for the high-rate UE may be transmitted with OFDMA instead of SCMA. This may be particularly relevant in a scenario in which signals for low-rate UEs have already been decoded.

If the spectral efficiency of the signal to be received by the high-rate UE is very high, and the SNR difference between the communications channels over which the signal and other signals being transmitted on a same set of available resource elements is high, then the signal for the high rate UE may be transmitted with OFDMA instead of SCMA.

Once it has been determined to transmit the signal for the high-rate UE with OFDMA instead of SCMA, the MCS for the high-rate UE can be recalculated for transmission using OFDMA.

Signaling to Support Mixed Transmission of SCMA/OFDMA

Aspects of the disclosure also include techniques for signaling information to the UEs that may be used to support multi-user multiplexed SCMA/OFDMA. In some embodiments, a transmitter that is transmitting the multi-user multiplexed SCMA/OFDMA signal transmits an indication to a high-rate UE whether a transmission mode being used to transmit the signal to the UE is OFDMA or SCMA. In some embodiments, the indication can be implicit. An example of such an implicit indication may be setting the number of SCMA layers for the signal to "1". This, in combination with the transmission rate of the signal, is an indication to the UE that the transmission mode is OFDMA. A high transmission rate signal would not likely be able to be sent using SCMA on only a single layer, thus if the UE is being sent an indication that the number of layers for transmission of the signal is one layer, the signal is being sent using OFDMA as multiple QAM symbols on a single layer.

In some embodiments, the transmitter of the combined SCMA/OFDMA signal transmits an indication of a power offset between the OFDMA and SCMA layers being transmitted.

In some embodiments, the transmitter of the combined SCMA/OFDMA signal transmits an indication of the MCS used to encode the signals to the UEs.

In order to decode the OFDMA portion of the multi-user multiplexed SCMA/OFDMA signal, the UE must have knowledge of the MCS information of the OFDMA portion. Therefore, when a UE attempts to decode the OFDMA portion without using SIC, the UE, whether it is a high rate UE or a low rate UE, needs to know the MCS information of the OFDMA portion. However, when a UE attempts to decode the SCMA portions of the multi-user multiplexed SCMA/OFDMA signal using SIC, and the UE is a low rate UE, i.e. the signal intended for the low rate UE will be decoded from the SCMA portion of the signal, the low rate UE does not need to know the MCS of the OFDMA portion of the signal because it is not decoding the OFDMA portion.

In some embodiments, UEs may feedback an indication of the computational capability of the receiver to the transmitter. The computational capability of the UEs can be assigned based on a rough quantitative identifier for a standardized range of computational capabilities, for example: low complexity, medium complexity and high-complexity. Transmitting the indication of the computational capability of the receiver may aid in the transmitter determining whether a signal transmitted to a given UE should be transmitted using orthogonal or non-orthogonal transmission modes.

Figure 7:
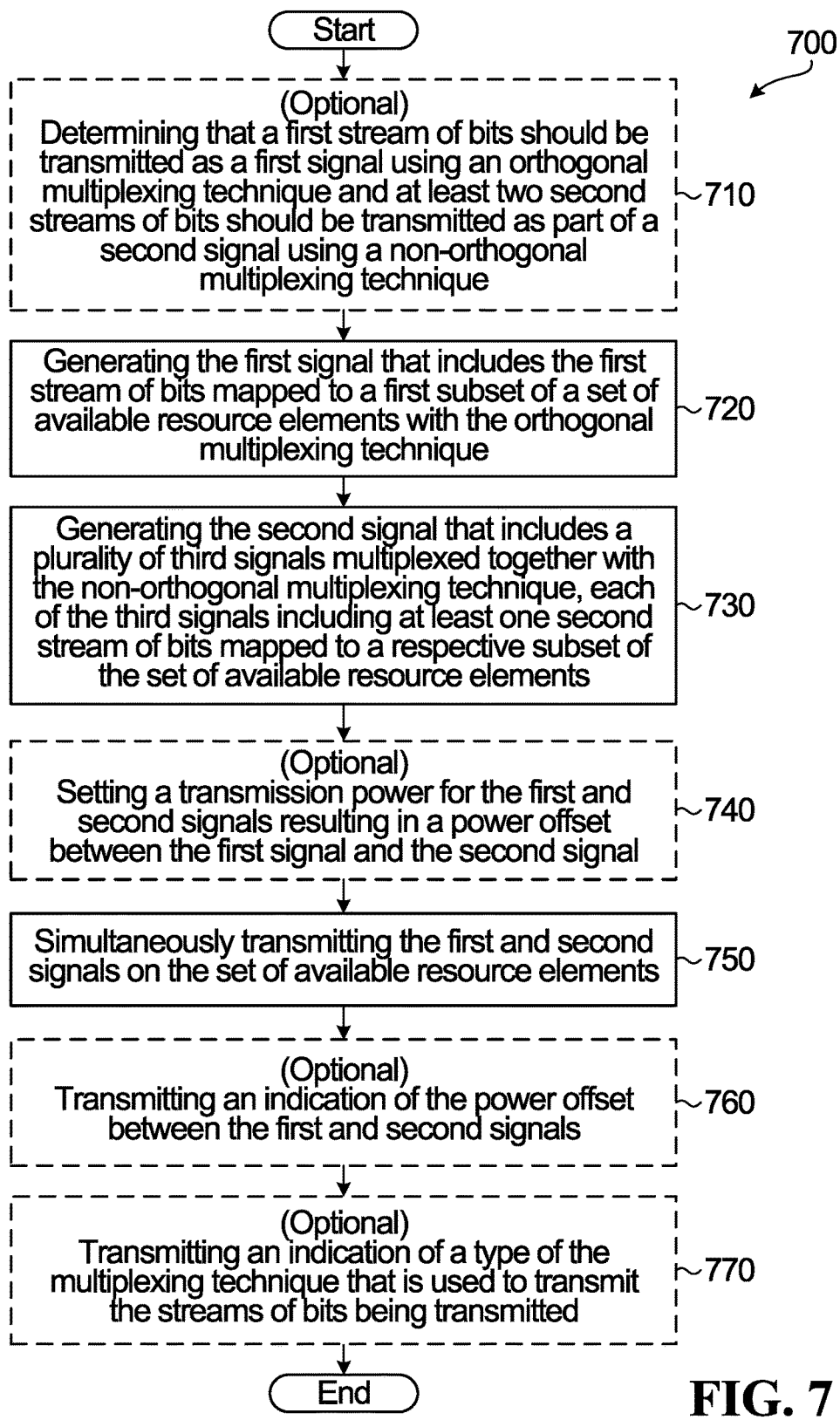
FIG. 7 is a flow chart describing a method for transmitting a first signal and a second signal according to an aspect of the disclosure.

Referring to the flow chart of FIG. 7, an example of a method 700 for a transmitter to simultaneously transmit at least one signal using a non-orthogonal multiplexing technique and at least one signal using an orthogonal multiplexing technique will be described. The transmitter may be a base station or a UE. Optional step 710 of the method 700 involves the transmitter determining that a first stream of bits should be transmitted as a first signal using an orthogonal multiplexing technique and at least two second streams of bits should be transmitted as a part of a second signal using a non-orthogonal multiplexing technique. Step 720 of the method 700 involves the transmitter generating the first signal that includes a first stream of bits mapped to a first subset of a set of available resource elements with the orthogonal multiplexing technique. The resource elements may be sub-carriers. Step 730 of the method 700 involves the transmitter generating the second signal that includes a plurality of third signals multiplexed together with the non-orthogonal multiplexing technique. Each of the third signals including at least one second stream of bits mapped to a respective second subset of the set of available resource elements. An optional step 740 involves the transmitter setting a transmission power for the first and second signals resulting in a power offset between the first and second signals. Step 750 of the method 700 involves the transmitter simultaneously transmitting the first and second signals on the set of available resource elements. An optional step 760 involves the transmitter transmitting an indication of the power offset between the first and second signals. An optional step 770 involves the transmitter transmitting to at least one receiver an indication of a type of the multiplexing technique that is used to transmit the stream of bits being transmitted to the at least one receiver. In some implementations the indication may be an implicit indication that the multiplexing technique is an orthogonal multiplexing technique.

In some embodiments, steps 760 and 770 may be performed before step 750. Steps 720 and 730 may be performed in a sequential order, with either step being performed first, or in parallel.

In some implementations, mapping the first and second streams of bits and simultaneously transmitting the first and second streams is performed by a base station for transmission to a plurality of UEs.

In some implementations, mapping the first stream of bits is performed by a first UE for transmission to a base station and mapping the at least one second stream of bits is performed by a second UE for transmission to the base station. The first and second streams are then simultaneously transmitted by the first and second UEs to the base station.

In some implementations, mapping the first and second streams of bits and simultaneously transmitting the first and second streams is performed by a first UE for transmission to a base station.

Mapping the first stream of bits may include mapping the first stream of bits using OFDMA and encoding the first stream of bits using Quadrature Amplitude Modulation (QAM) or Phase Shift Keying (PSK). Mapping the second stream of bits comprises mapping the at least one second stream of bits using code domain non-orthogonal multiplexing.

Mapping the at least one second stream of bits may include using SCMA, in which the at least one second stream of bits is encoded using an SCMA codebook. When multiple second streams of bits are each spread over a subset of a set of resource elements with a non-orthogonal multiplexing technique, each of the multiple second streams of bits is encoded with a respective SCMA codebook.

In some embodiments, determining that the first stream of bits should be transmitted with the orthogonal multiplexing technique involves determining a complexity value for decoding the first stream of bits and any other second streams of bits being transmitted if the streams of bits are transmitted using only a non-orthogonal multiplexing technique. If the complexity value is greater than a complexity threshold defining a complexity capability for decoding the streams of bits, then the first stream of bits is mapped with the orthogonal multiplexing technique. A device performing the mapping and transmitting may receive an indication of a complexity constraint of a receiver, which is used by the device at least in part to define the complexity threshold.

Figure 8A:
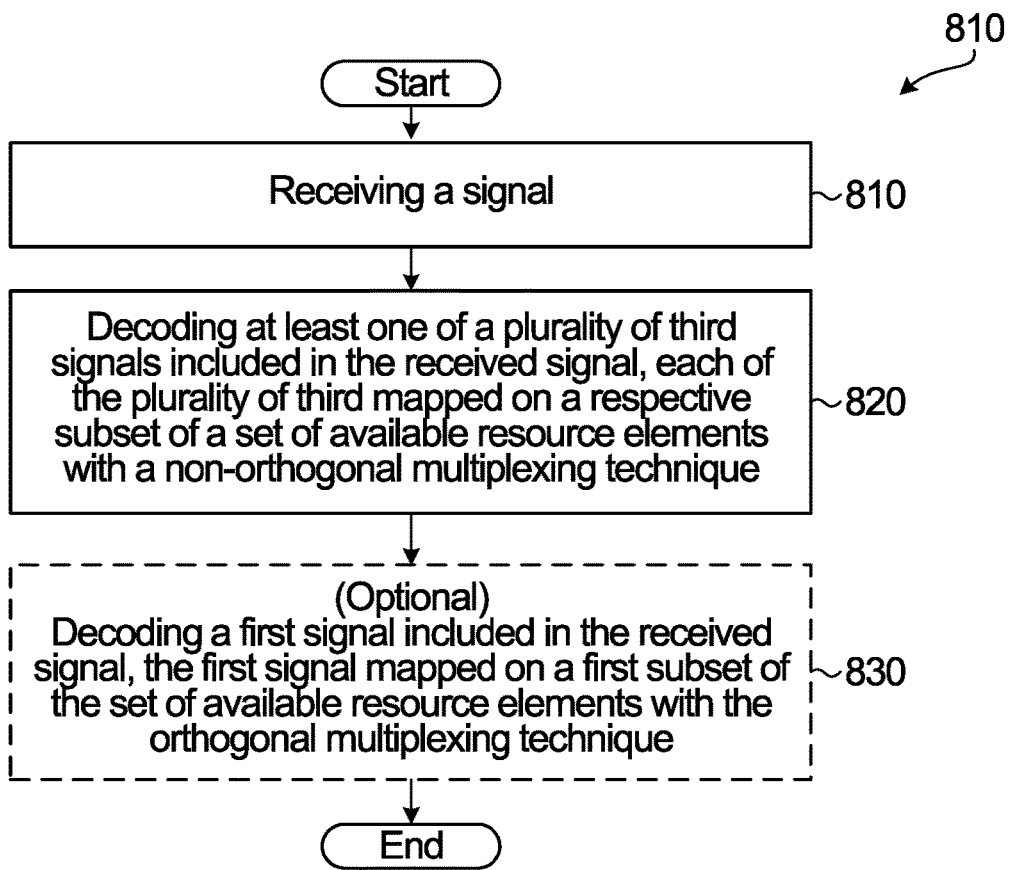
FIG. 8A is flow chart describing a method for decoding a first signal component and a second signal component according to an aspect of the disclosure.

In some embodiments, the method further involves transmitting an indication of a modulation and coding scheme used to encode at least one of: the first stream of bits and the second stream of bits Referring to the flow chart of FIG. 8A, an example of a method 800 for a receiver decoding a signal having a first signal transmitted with an orthogonal multiplexing technique and a second signal transmitted with a non-orthogonal multiplexing technique from a received multi-user communication signal will be described. The receiver may be a base station receiving one or more signals from one or more respective UEs transmitting in the uplink direction or a UE receiving a signal from a base station in the downlink direction. The method 800 involves a step 810 of the receiver receiving a signal. The received signal includes a first signal that includes a first stream of bits mapped on a first subset of a set of available resource elements with an orthogonal multiplexing technique. The received signal also includes a second signal that includes a plurality of third signals multiplexed together with a non-orthogonal multiplexing technique. Each of the third signals is at least one stream of bits mapped on a respective subset of the set of available resource elements. Step 820 involves the receiver decoding at least one of the third signals mapped on a respective subset of the set of available resource elements with the non-orthogonal multiplexing technique. An optional step 830 involves the receiver decoding the first signal mapped on a first subset of a set of available resource elements with the orthogonal multiplexing technique.

Figure 8B:
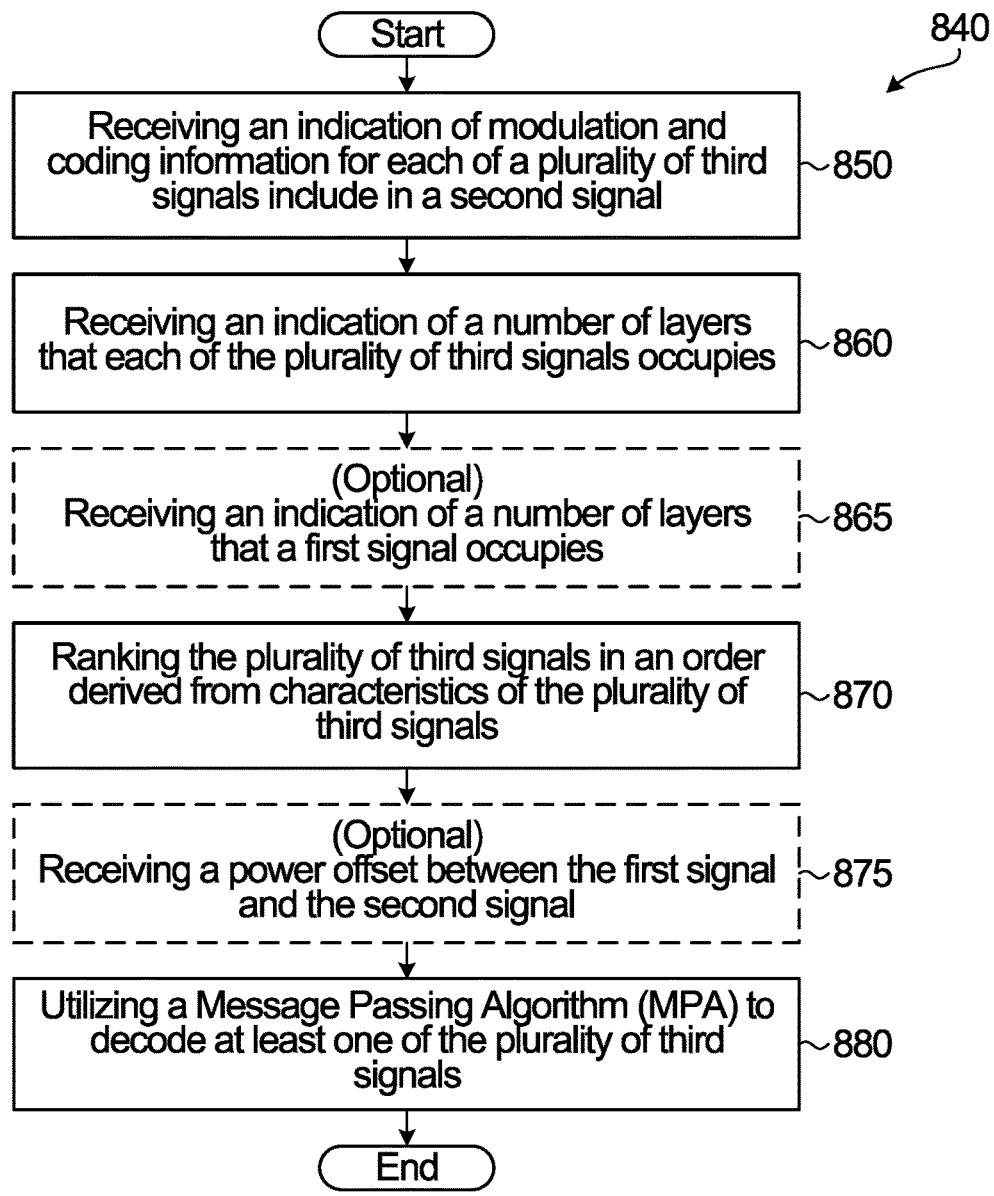
FIG. 8B is flow chart describing a method for decoding a one or more of a plurality of signals that are multiplexed with a non-orthogonal multiplexing technique according to an aspect of the disclosure.

Referring to the flow chart of FIG. 8B, an example of a method 840 for decoding the at least one of the third signals using MPA will now be described. Step 850 of method 840 involves the receiver receiving an indication of modulation and coding information for each of a plurality of third signals. In some embodiments an indication of modulation and coding information for the first signal may also be received. Step 860 involves the receiver receiving an indication of a number of layers that each of the plurality of third signals occupies. An optional step 865 involves the receiver receiving an indication of a number of layers that the first signal occupies.

Step 870 involves the receiver ranking the third signals in an order derived from characteristics of the third signals. Examples of characteristics may include the modulation and coding information and channel gain of the third signals. An optional step 875 involves the receiver receiving a power offset between the first signal and the second signal. Step 880 involves the receiver utilizing a MPA to decode at least some of the plurality of third signals.

As described above, in some situations the receiver uses the MPA to decode all of the third signals, which are transmitted with a non-orthogonal multiplexing technique and the first signal, which is transmitted with an orthogonal multiplexing technique. In other situations, the receiver uses SIC MPA to decode the signal intended for the receiver. For example, if the receiver is intended to receive the plurality of third signals (non-orthogonal multiplexing technique), the SIC MPA may decode at least some of the third signals, i.e. the receiver will decode at least until the receiver decodes the signal intended for the receiver. If the receiver is intended to receive the first signal (orthogonal multiplexing technique), the SIC MPA attempts to decode all of the third signals. Then the receiver can use SIC to recover the first signal and use conventional means to decode the first signal. If the receiver cannot decode all of the plurality of third signals, the receiver may treat the undecoded third signals as noise when attempting to decode the first signal using conventional means.

Utilizing the MPA to decode the at least one third signal transmitted with the non-orthogonal multiplexing technique may further include, updating a factor graph used by the MPA by removing branches of the factor graph associated with the at least one signal transmitted with the orthogonal multiplexing technique. A noise covariance value input to the message passing algorithm can then be recalculated by including the at least one signal transmitted with the orthogonal multiplexing technique as part of a noise value used in the noise covariance value. Subsequent to recalculating the noise covariance value input, the MPA can be revised based on the updated factor graph and recalculated noise covariance value. The revised message passing algorithm is then used to decode the at least one signal transmitted with the non-orthogonal multiplexing technique.

In some embodiments, the method may further include a step of receiving an indication of a power offset between the at least one signal transmitted with the orthogonal multiplexing technique and the at least one signal transmitted with the non-orthogonal multiplexing technique.

In some embodiments, the method may further include a step of receiving an indication of whether the receiver will be receiving a signal transmitted with an orthogonal multiplexing technique or a signal transmitted with a non-orthogonal multiplexing technique. In some embodiments, the method may further include a step of transmitting an indication of a complexity constraint of a receiver.

Figure 9:
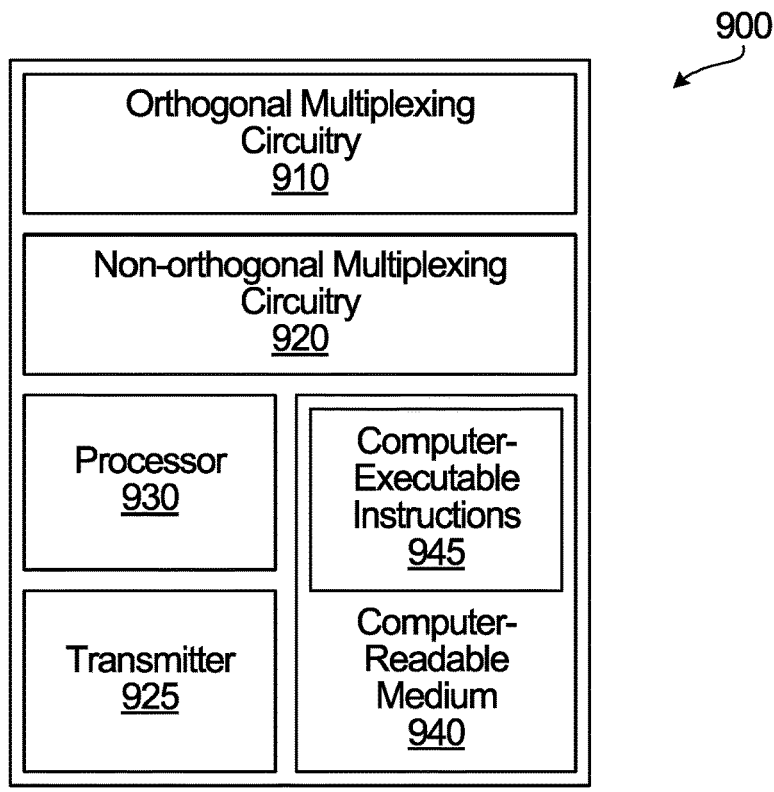
FIG. 9 is a block diagram of an apparatus according to an aspect of the disclosure.

Referring to FIG. 9, an example of an apparatus 900 configured to implement aspects of the disclosure will now be described. FIG. 9 would be directed in particular to aspects in which the apparatus is part of, or is collocated with, a base station transmitting in a downlink direction to a plurality of receivers. The apparatus 900 includes orthogonal multiplexing circuitry 910, non-orthogonal multiplexing circuitry 920, at least one antenna 922, transmitter 925, a processor 930 and a computer-readable medium 940. The computer-readable medium 940 includes computer executable instructions 945 that when executed by the processor 930 are configured control the orthogonal multiplexing circuitry 910 to generate a first signal that includes a first stream of bits mapped to a first subset of a set of available resource elements with an orthogonal multiplexing technique. The computer-readable medium 940 includes computer executable instructions 945 that when executed by the processor 930 are configured control the non-orthogonal multiplexing circuitry 920 to generate a second signal that includes a plurality of third signals multiplexed together with a non-orthogonal multiplexing technique. Each of the third signals includes at least one second stream of bits mapped to a respective subset of the set of available resource elements. The transmitter 925 then simultaneously transmits the first and second signals on the set of available resource elements.

The computer executable instructions, when executed by the processor 930, are configured to map the first stream of bits using Orthogonal Frequency Division Multiple Access (OFDMA). The first stream of bits may be encoded using, for example but not limited to, Quadrature Amplitude Modulation (QAM) or Phase Shift Keying (PSK).

The computer executable instructions, when executed by the processor 930, are configured to control the non-orthogonal multiplexing circuitry to generate the second signal by multiplexing the plurality of third signals using code domain non-orthogonal multiplexing. In some embodiments, the multiplexing of the plurality of third signals is performed using Sparse Code Multiple Access (SCMA)

The computer executable instructions are configured to determine that a first stream of bits should be transmitted as the first signal using the orthogonal multiplexing technique and the second stream of bits should be transmitted as part of the second signal using the non-orthogonal multiplexing technique. The determination of the multiplexing technique may be based on the spectral efficiency of the stream of bits. The determination of the multiplexing technique may be based on a spectral efficiency of the stream of bits as well as a signal-to-noise ratio difference between the communications channels over which the stream of bits and other streams of bits being transmitted on the same set of available resource elements.

In some embodiments, the computer executable instructions, when executed by the processor 930, are configured to determine a complexity value for decoding the first stream of bits, and any other streams of bits being transmitted, if the streams of bits were to be transmitted as part of the second signal using only a non-orthogonal multiplexing technique. If the complexity value is determined to be greater than a complexity threshold defining a complexity value for decoding the streams of bits, the stream of bits can be mapped with the orthogonal multiplexing technique.

In some embodiments, the apparatus can allocate a power offset between the first signal and the second signal. The apparatus may transmit the indication of the power offset between the first signal and the second signal to receivers that are receiving the first and second signals.

The apparatus may transmit an indication of a modulation and coding scheme used to encode the first signal and at least one of the third signals.

The non-orthogonal and orthogonal multiplexing circuitry can be hardware or software or a combination of the two.

In some embodiments, the apparatus is configured to receive an indication of a complexity constraint of a receiver to aid in defining the decoding complexity threshold.

In some embodiments, the apparatus is configured to transmit to at least one receiver of the plurality of receivers an indication of the type of signal that the at least one receiver will be receiving, a signal transmitted with the orthogonal multiplexing technique or a signal transmitted with the non-orthogonal multiplexing technique.

Figure 10:
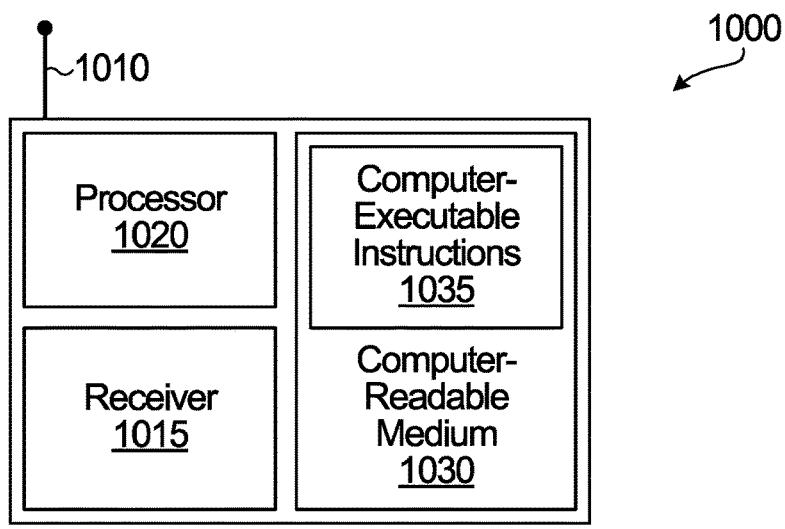
FIG. 10 is a block diagram of an apparatus according to an aspect of the disclosure.

Referring to FIG. 10, an example of an apparatus 1000 configured to implement aspects of the disclosure will now be described. FIG. 10 could be directed, in some embodiments, to aspects in which the apparatus is one of multiple UE for decoding a signal transmitted with an orthogonal multiplexing technique and a signal transmitted with a non-orthogonal multiplexing technique from a received multi-user communication signal. The received multi-user communication signal includes a first signal including a first stream of bits mapped on a first subset of a set of available resource elements with an orthogonal multiplexing technique and a second signal including a plurality of third signals multiplexed together with a non-orthogonal multiplexing technique. Each of the third signals is at least one stream of bits mapped on a respective subset of the set of available resource elements. The apparatus 1000 includes at least one antenna 1010 and receiver 1015 for receiving the first signal and the second signal, a processor 1020 and a computer-readable medium 1030. The computer-readable medium 1030 includes computer executable instructions 1035 that when executed by the processor 1020, cause the processor 1020 to decode at least one of the third signals. The computer executable instructions 1035 may also cause the processor 1020 to decode the first signal. The computer executable instructions 1035 may cause the processor 1020 to decode the first and the at least one third signals in a manner consistent with the methods described above.

The apparatus 1000 also has elements for providing standard UE operation, such as display, possibly keyboard, speaker, microphone, etc. A portion of the computer-readable medium 1030 may include computer-executable instructions for implementing the MPA.

In some embodiments, the apparatus is configured to transmit an indication of a complexity constraint of the receiver to the transmitter.

Numerous modifications and variations of the present disclosure are possible in light of the above teachings. It is therefore to be understood that within the scope of the appended claims, the disclosure may be practised otherwise than as specifically described herein.

We claim:

1. A method comprising:
   generating a first signal that includes a first stream of bits mapped to a set of available resource elements comprising a plurality of tones using an orthogonal multiple access technique, wherein the first stream of bits are mapped to symbols and the symbols are mapped to all of the plurality of tones in the set of available resource elements;
   generating a second signal that includes a plurality of third signals multiplexed together using a non-orthogonal multiple access technique, each of the third signals including at least one second stream of bits mapped to a respective subset of the set of available resource elements, each subset of available resource elements including one or more and less than all of the tones of the plurality of tones in the set of available resource elements; and
   simultaneously transmitting the first and second signals on the set of available resource elements, wherein the first signal and the second signal share at least one tone of the plurality of tones in the set of available resource elements.

2. The method of claim 1, wherein:
   generating the first signal comprises mapping the first stream of bits using Orthogonal Frequency Division Multiple Access (OFDMA); and generating the second signal comprises multiplexing the plurality of third signals using code domain non-orthogonal multiple access.

3. The method of claim 1, wherein generating the first signal comprises encoding the first stream of bits using one of Quadrature Amplitude Modulation (QAM) or Phase Shift Keying (PSK).

4. The method of claim 1, wherein generating the second signal comprises multiplexing the plurality of third signals using Sparse Code Multiple Access (SCMA).

5. The method of claim 4, wherein generating the second signal further comprises encoding each of the at least one second streams of bits associated with the third signals using at least one SCMA codebook.

6. The method of claim 1 further comprising determining a first stream of bits to be used in generating the first signal using the orthogonal multiple access technique.

7. The method of claim 6, wherein determining the first stream of bits to be used in generating the first signal comprises:
    determining a complexity value for decoding the first stream of bits and the at least one second streams of bits in the second signal to be transmitted, if the stream of bits were all to be transmitted as part of the second signal using the non-orthogonal multiple access technique; and
    if the complexity value is greater than a complexity threshold defining a complexity value for decoding the second signal, mapping the first stream of bits with the orthogonal multiple access technique.

8. The method of claim 7 further comprising receiving an indication of a complexity constraint of a receiver to at least in part define the complexity threshold.

9. The method of claim 6, wherein the determining the first stream of bits to be used in generating the first signal is based on a spectral efficiency of the stream of bits.

10. The method of claim 6, wherein the determining the first stream of bits to be used in generating the first signal is based on a spectral efficiency of the stream of bits and a signal-to-noise ratio difference between the communications channels over which the stream of bits and other streams of bits being transmitted on the same set of available resource elements.

11. The method of claim 1, wherein simultaneously transmitting the first and second signals comprises transmitting in a downlink direction from a network side component to a plurality of User Equipment (UEs).

12. The method of claim 1 further comprising setting transmission power for the first signal and for the second signal resulting in a power offset between the first signal and the second signal.

13. The method of claim 12 further comprising transmitting an indication of the power offset between the first signal and the second signal.

14. The method of claim 1 further comprising transmitting an indication of a modulation and coding scheme used to encode at least one of:
    the first signal; and
    at least one of the third signals of the second signal.

15. The method of claim 1 further comprising transmitting to at least one receiver an indication of a type of the multiple access technique that is used to transmit at least one of the first signal and at least one of the plurality of third signals in the second signal being transmitted to the at least one receiver.

16. The method of claim 15, wherein the indication is an implicit indication that the multiple access technique is an orthogonal multiple access technique.

17. An apparatus comprising:
orthogonal multiple access circuitry;
non-orthogonal multiple access circuitry;
a transmitter;
a processor; and
a computer-readable medium, the computer-readable medium having stored thereon computer executable instructions that when executed by the processor are configured to:
    control the orthogonal multiple access circuitry to generate a first signal that includes a first stream of bits mapped to a set of available resource elements comprising a plurality of tones using an orthogonal multiple access technique, wherein the first stream of bits are mapped to symbols and the symbols are mapped to all of the plurality of tones in the set of available resource elements; and
    control the non-orthogonal multiple access circuitry to generate a second signal that includes a plurality of third signals multiplexed together with a non-orthogonal multiple access technique, each of the third signals including at least one second stream of bits mapped to a respective subset of the set of available resource elements, each subset of available resource elements including one or more and less than all of the tones of the plurality of tones in the set of available resource elements; and
    the transmitter configured to simultaneously transmit the first and second signals on the set of available resource elements, wherein the first signal and the second signal share at least one tone of the plurality of tones in the set of available resource elements.

18. The apparatus of claim 17, wherein:
the orthogonal multiple access circuitry is configured to map the first stream of bits using Orthogonal Frequency Division Multiple Access (OFDMA); and
the non-orthogonal multiple access circuitry is configured to multiplex the plurality of third signals using code domain non-orthogonal multiple access.

19. The apparatus of claim 18, wherein the orthogonal multiple access circuitry is configured to encode the first set of bits using one of Quadrature Amplitude Modulation (QAM) or Phase Shift Keying (PSK).

20. The apparatus of claim 17, wherein the non-orthogonal multiple access circuitry is configured to multiplex each of the third signals by using Sparse Code Multiple Access (SCMA).

21. The apparatus of claim 17, wherein the computer executable instructions, when executed by the processor, are further configured to:
    determine that the first stream of bits to be used in generating the first signal using the orthogonal multiple access technique.

22. The apparatus of claim 21, wherein the computer executable instructions, when executed by the processor, are further configured to:
    determine a complexity value for decoding the first stream of bits, and the at least one second streams of bits being transmitted if the streams of bits were to be transmitted as part of the second signal using only a non-orthogonal multiple access technique; and
    if the complexity value is greater than a complexity threshold defining a complexity value for decoding the streams of bits, map the first stream of bits with the orthogonal multiple access technique.

* * * * *